(12) United States Patent
Yoneda

(10) Patent No.: US 8,564,261 B2
(45) Date of Patent: Oct. 22, 2013

(54) POWER CONVERTING APPARATUS, GRID INTERCONNECTION APPARATUS AND GRID INTERCONNECTION SYSTEM

(75) Inventor: Fumiiki Yoneda, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/338,908

(22) Filed: Dec. 28, 2011

(65) Prior Publication Data

US 2012/0155126 A1    Jun. 21, 2012

Related U.S. Application Data

(63) Continuation of application No. PCT/JP2011/051359, filed on Jan. 25, 2011.

(30) Foreign Application Priority Data

Jan. 25, 2010    (JP) ................................. 2010-013101

(51) Int. Cl.
    *G05F 1/563*    (2006.01)
(52) U.S. Cl.
    USPC ............................ 323/266; 323/285; 323/906
(58) Field of Classification Search
    USPC ............ 323/266, 906, 285, 299; 363/97, 131, 363/132
    See application file for complete search history.

(56) References Cited

U.S. PATENT DOCUMENTS

| | | | | |
|---|---|---|---|---|
| 4,251,857 A | * | 2/1981 | Shelly | .............................. 363/26 |
| 4,686,615 A | * | 8/1987 | Ferguson | ......................... 363/17 |
| 6,215,287 B1 | | 4/2001 | Matsushiro et al. | |
| 6,958,594 B2 | | 10/2005 | Redl et al. | |
| 7,079,406 B2 | * | 7/2006 | Kurokami et al. | ......... 363/56.03 |
| 7,394,237 B2 | * | 7/2008 | Chou et al. | .................... 323/299 |
| 7,511,447 B2 | * | 3/2009 | Ishikawa et al. | .............. 318/801 |
| 7,688,608 B2 | * | 3/2010 | Oettinger et al. | ............. 363/132 |
| 7,791,915 B2 | * | 9/2010 | Chatroux et al. | ............. 363/132 |
| 8,143,856 B2 | * | 3/2012 | Andrea et al. | ................ 320/128 |

(Continued)

FOREIGN PATENT DOCUMENTS

| | | |
|---|---|---|
| JP | 61-030960 A | 2/1986 |
| JP | 11-196532 A | 7/1999 |

(Continued)

OTHER PUBLICATIONS

International Search Report of PCT/JP2011/051359, mailing date Apr. 26, 2011.

*Primary Examiner* — Jeffrey Sterrett
(74) *Attorney, Agent, or Firm* — Westerman, Hattori, Daniels & Adrian, LLP

(57) ABSTRACT

A power converting apparatus is provided with a step-up chopper circuit (2) that steps-up an input voltage (Vi) from a distributed power supply, an inverter circuit (3) that converts the output voltage (Vd) of the step-up chopper circuit (2) into alternating current, a first control circuit for controlling the output voltage (Vd), and a second control circuit for controlling the chopper input current (Ii). The first control circuit generates a target current value (Ir) so as to make the output voltage (Vd) become a target output voltage value (Vr). The second control circuit controls the step-up chopper circuit (2) so as to make the chopper input current (Ii) become the target current value (Ir). The first control circuit also has a low-pass filter (23a) that removes ripple components included in the output voltage (Vd).

7 Claims, 11 Drawing Sheets

(56) References Cited

U.S. PATENT DOCUMENTS

| | | | |
|---|---|---|---|
| 8,259,479 B2* | 9/2012 | Wagoner et al. | 363/97 |
| 2005/0156582 A1 | 7/2005 | Redl et al. | |
| 2011/0103117 A1* | 5/2011 | Yoneda | 363/132 |
| 2012/0075898 A1* | 3/2012 | Sigamani et al. | 363/131 |
| 2012/0134191 A1* | 5/2012 | Yoneda | 363/131 |
| 2012/0155126 A1* | 6/2012 | Yoneda | 363/40 |

FOREIGN PATENT DOCUMENTS

| | | |
|---|---|---|
| JP | 2000-020150 A | 1/2000 |
| JP | 2000-152647 A | 5/2000 |
| JP | 2000-324810 A | 11/2000 |
| JP | 2005-229792 A | 8/2005 |
| JP | 2007-082317 A | 3/2007 |
| JP | 2007-519390 A | 7/2007 |

* cited by examiner

POWER CONVERTING APPARATUS, GRID INTERCONNECTION APPARATUS AND GRID INTERCONNECTION SYSTEM

CROSS REFERENCE

This application is a Continuation of PCT Application No. PCT/JP2011/051359 filed on Jan. 25, 2011, and claims the priority of Japanese Patent Application No. 2010-013101, filed on Jan. 25, 2010, the content of both of which is incorporated herein by reference.

TECHNICAL FIELD

The present invention relates to a power converting apparatus, a grid interconnection apparatus and a grid interconnection system which steps up or down voltage from a distributed power supply, such as a solar cell and a fuel cell, and then converts the voltage into AC voltage.

BACKGROUND ART

In the related art, this kind of power converting apparatus is provided with a DC-DC converter circuit which steps up or down voltage from a distributed power supply, a DC-AC converter circuit which converts output voltage of the DC-DC converter circuit into AC, and a control circuit which controls the DC-DC converter circuit to keep the output voltage of the DC-DC converter circuit at a voltage target value.

Since this kind of power converting apparatus outputs AC, a large ripple current with twice the frequency of the AC output from the power converting apparatus usually flows through an input current of the power converting apparatus and a reactor input current (hereinafter, these currents will simply be referred to as an "input current"). Therefore, there is a problem that the burden and loss of the reactor and a switching element of the DC-DC converter circuit become large.

In order to address this problem, a power converting apparatus in which a ripple component included in an input current of a DC-DC converter circuit is extracted in a control circuit and compensates for a control input of the DC-DC converter circuit using the extracted ripple component has been proposed (see Patent Literature 1).

In particular, in the power converting apparatus disclosed in Patent Literature 1, a control circuit generates a first error signal indicating an error between output voltage of a DC-DC converter circuit and a voltage target value, and compensates for an input of an output voltage controlling circuit of the DC-DC converter circuit with a second error signal indicating an error between the first error signal and the extracted ripple component.

The power converting apparatus disclosed in Patent Literature 1 attempts to cancel the ripple component included in the first error signal with the extracted ripple component described above. However, in order to completely cancel the ripple component included in the first error signal, it is necessary to let the ripple component included in the first error signal and the extracted ripple component exactly correspond with each other in the phase and amplitude and thus implement thereof is difficult in practice.

Consequently, there has been a problem in the power converting apparatus disclosed in Patent Literature 1 that since it is not possible to sufficiently suppress the ripple component included in the input current of the DC-DC converter circuit and to sufficiently reduce the burden and loss of the device in the DC-DC converter circuit, increasing efficiency, reducing size and lowering cost of the entire power converting apparatus cannot be achieved.

CITATION LIST

Patent Literature

Patent Literature 1: Japanese Unexamined Patent Application Publication No. 61-30960

SUMMARY OF INVENTION

A power converting apparatus according to a first feature includes a DC-DC converter circuit (step-up chopper circuit 2) configured to step up or down input voltage (input voltage Vi) from a DC power supply (e.g. solar cell) and a DC-AC converter circuit (inverter circuit 3) configured to convert output voltage (output voltage Vd) of the DC-DC converter circuit into AC. The power converting apparatus includes: a first control circuit (voltage detector PT or PT', error calculator 21, low-pass filter 23*a*, low-pass filter 23*b*, low-pass filter 23*c*, output voltage controller 22) configured to control the output voltage; and a second control circuit (current detector DCT, error calculator 31, input current controller 32, PWM comparator 33) configured to control an input current (chopper input current Ii or reactor input current IL) of the DC-DC converter circuit. The first control circuit generates a target current value (target current value Ir) which is a target value of the input current such that the output voltage becomes a voltage target value (output voltage target value Vr) which is a target value of the output voltage. The second control circuit controls the DC-DC converter circuit such that the input current becomes the target current value generated by the first control circuit. The first control circuit is provided with a ripple removing circuit (low-pass filter 23*a*, low-pass filter 23*b*, low-pass filter 23*c*, or low-pass filter 23*d*) configured to remove a ripple component included in the output voltage.

A power converting apparatus according to a second feature includes a DC-DC converter circuit (step-up chopper circuit 2) configured to adjust an input voltage (input voltage Vi) from a distributed power supply (e.g. solar cell), or adjusts an input voltage to the distributed power supply and a DC-AC converter circuit (inverter circuit 3) configured to convert a voltage from DC into AC, or convert voltage from AC into DC. The power converting apparatus includes: a first control circuit (voltage detector PT or PT', error calculator 21, low-pass filter 23*a*, low-pass filter 23*b*, low-pass filter 23*c*, output voltage controller 22) configured to control an output voltage output from the DC-AC converter circuit; and a second control circuit (current detector DCT, error calculator 31, input current controller 32, PWM comparator 33) configured to control an input current (chopper input current Ii or reactor input current IL) input in the DC-DC converter circuit. The first control circuit generates a target current value (target current value Ir) which is a target value of the input current such that the output voltage becomes a voltage target value (output voltage target value Vr) which is a target value of the output voltage. The second control circuit controls the DC-DC converter circuit such that the input current becomes the target current value generated by the first control circuit. The first control circuit is provided with a ripple removing circuit (low-pass filter 23*a*, low-pass filter 23*b*, low-pass filter 23*c*, or low-pass filter 23*d*) configured to remove a ripple component included in the output voltage.

According to the first feature or the second feature, an input current and output voltage of the DC-DC converter circuit are controlled collectively by cascade control which uses an output of the first control circuit as a target value (a target current value) of the second control circuit.

Here, since the first control circuit is provided with the ripple removing circuit which removes the ripple component included in the output voltage of the DC-DC converter circuit, the target value (the target current value) of the second control circuit achieves a DC level which includes substantially no ripple component. The second control circuit controls the DC-DC converter circuit on the basis of such a DC level, whereby the input current which is to be controlled also achieves a DC level which includes substantially no ripple component.

Therefore, the ripple component included in the input current of the DC-DC converter circuit is suppressed substantially completely and thus the peak value of the input current is sufficiently suppressed, whereby the burden and loss of the device in the DC-DC converter circuit can be reduced sufficiently.

Consequently, according to the power converting apparatus related to the characteristics of the present invention, it is possible to increase efficiency, reduce size and lower cost of the entire power converting apparatus.

In the first feature or the second feature, the first control circuit is provided with a voltage detector (voltage detector PT) configured to detect the output voltage, an error calculator (error calculator 21) configured to generate an error signal indicating an error between the detected output voltage and the voltage target value and a controller (output voltage controller 22) configured to generate the target current value from the error signal. The ripple removing circuit is provided on an input side or an output side of the controller, or between the voltage detector and the error calculator.

According to the feature, a ripple removing process by the ripple removing circuit can be performed as digital signal processing and thus it is especially suited for a software-based process.

In the first feature or the second feature, the first control circuit includes a voltage detector (voltage detector PT) configured to detect the output voltage, an error calculator (error calculator 21) configured to generate an error signal indicating an error between the detected output voltage and the voltage target value, and a controller (output voltage controller 22) configured to generate the target current value from the error signal. The voltage detector is provided with the ripple removing circuit.

According to the feature, the voltage detector for detecting the output voltage of the DC-DC converter circuit is provided with the ripple removing circuit, and it is not necessary to separately provide the ripple removing circuit. The ripple removing circuit can be provided in the voltage detector and thus it is especially suited for a hardware-based process.

In the first feature or the second feature, the power converting apparatus further includes a tracking control circuit (MPPT control circuit 130) configured to perform optimum power point tracking control in which the distributed power supply is made to operate at the optimum operating point on the basis of the input current and the input voltage.

According to the feature, since the follow up control of the distributed power supply can be performed on the basis of the input current of which ripple component is suppressed substantially completely by the power converting apparatus according to the first feature, precision, responsiveness and stability of the follow up control can be improved.

In the first feature or the second feature, the distributed power supply is a solar cell, a fuel cell or a storage battery.

A grid interconnection apparatus according to a third feature includes the power converting apparatus according to the first feature or the second feature. The power converting apparatus is configured to interconnect the distributed power supply to a distribution system.

According to the feature, since the grid interconnection apparatus can be configured using a power converting apparatus with increased efficiency, reduced size and lowered cost, it is possible to contribute to provide the entire grid interconnection apparatus with high efficiency, reduced size and lowered cost.

A grid interconnection system according to a fourth feature includes the distributed power supply and the power converting apparatus according to the first feature or the second feature. The power converting apparatus is configured to interconnect the distributed power supply to a distribution system.

According to these feature, since the grid interconnection system can be configured using a power converting apparatus with increased efficiency, reduced size and lowered cost, it is possible to contribute to provide the entire grid interconnection system with high efficiency, reduced size and lowered cost.

MODES FOR CARRYING OUT THE INVENTION

Figure 1:
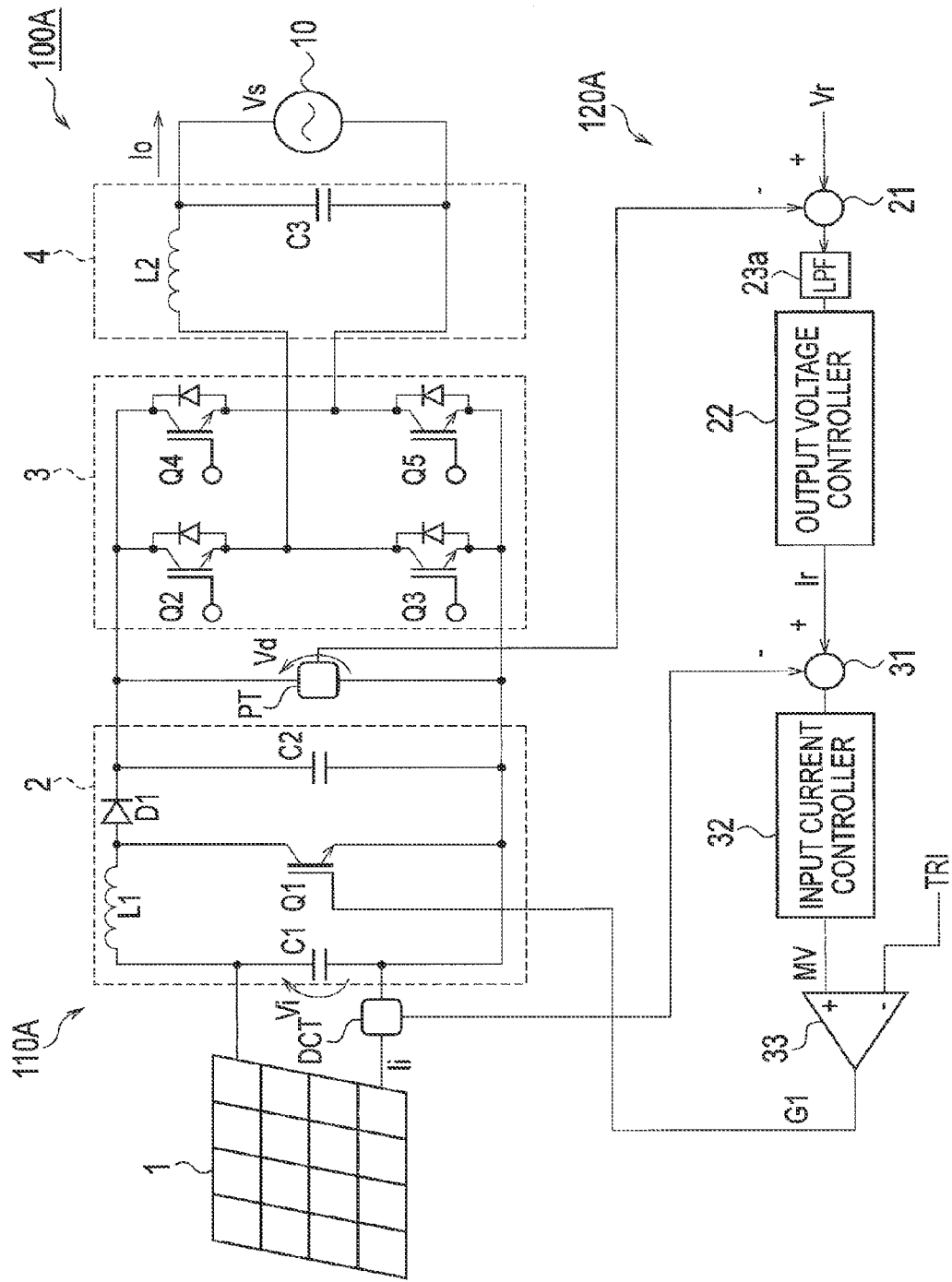
FIG. 1 is a configuration diagram of a grid interconnection system provided with a grid interconnection apparatus according to a first embodiment.

Next, first to fourth embodiments of the present invention and other embodiments will be described with reference to the drawings. In the drawings in the following embodiments, identical or similar reference numerals are given to identical or similar components.

First Embodiment

In the following, a grid interconnection apparatus according to a first embodiment will be described in the order of (1) Schematic Structure, (2) Main Circuit, (3) Control Unit and (4) Operation and Effect.

(1) Schematic Structure

FIG. 1 is a configuration diagram of a grid interconnection system provided with a grid interconnection apparatus 100A according to the first embodiment.

The grid interconnection system illustrated in FIG. 1 is provided with a solar cell 1, a grid interconnection apparatus 100A and a distribution system 10. The solar cell 1 is a distributed type distributed power supply which outputs DC power produced by power generation in accordance with sunlight irradiation.

The grid interconnection apparatus 100A converts DC power from the solar cell 1 into AC power of the commercial frequency (for example, 50 Hz or 60 Hz). Load (not illustrated) installed in a consumer is connected between the grid interconnection apparatus 100A and the distribution system 10. The grid interconnection apparatus 100A performs a grid operation to supply the load with AC power from both the grid interconnection apparatus 100A and the distribution system 10.

The grid interconnection apparatus 100A is provided with a main circuit 110A and a control unit 120A which controls the main circuit 110A. In the present embodiment, the main circuit 110A and the control unit 120A constitute a power converting apparatus.

The main circuit 110A is provided with a step-up chopper circuit 2, an inverter circuit 3 and a filter circuit 4.

The step-up chopper circuit 2 is a chopper circuit which controls an input voltage Vi from the solar cell 1. In the first embodiment, the step-up chopper circuit 2 steps up the input voltage Vi by high-frequency switching at all times. In the first embodiment, the step-up chopper circuit 2 constitutes a DC-DC converter circuit.

The inverter circuit 3 converts output voltage Vd of the step-up chopper circuit 2 into AC. In the first embodiment, the inverter circuit 3 constitutes a DC-AC converter circuit.

The filter circuit 4 removes a high frequency component of AC power output from the inverter circuit 3 and outputs that AC power to the distribution system 10 (and to the load).

The control unit 120A controls a step-up operation by the step-up chopper circuit 2 using a gate signal G1 which drives the step-up chopper circuit 2.

The control unit 120A controls an operation of the inverter circuit 3 using a gate signal (not illustrated) which drives the inverter circuit 3. As a configuration of the control unit 120A relating to the inverter circuit 3, an existing circuit configuration is used and a configuration of the control unit 120A relating to the step-up chopper circuit 2 will be described below.

(2) Main Circuit

With continuous reference to FIG. 1, a main circuit 110A will be illustrated.

A current detector DCT is connected preceding the step-up chopper circuit 2. The current detector DCT detects a chopper input current Ii. In the following description, "preceding" means the side of the solar cell 1 and "subsequent" means the side of the distribution system 10.

The step-up chopper circuit 2 is provided with an input stage condenser C1, a reactor L1, a switching element Q1, a diode D1 and an intermediate stage capacitor C2. Although an insulated gate bipolar transistor (IGBT) is exemplified as the switching element Q1 in the first embodiment, the switching element Q1 may also be a power MOSFET, for example.

The input stage condenser C1 is for smoothing the input voltage Vi from the solar cell 1.

The switching element Q1 steps up the input voltage Vi by high-frequency switching in response to the gate signal G1 from the control unit 120A and current waveforms of the chopper input current Ii and of the reactor L1 are controlled by the control unit 120A modulating a pulse width of the gate signal G1 (PWM control).

The intermediate stage capacitor C2 is for removing a high frequency component included in the output voltage Vd.

The Voltage detector PT is connected subsequent to the step-up chopper circuit 2. The voltage detector PT detects the output voltage Vd.

The inverter circuit 3 is provided with a switching element Q2, a switching element Q3, a switching element Q4 and a switching element Q5 which are full-bridge connected. Although the IGBT is exemplified as the switching elements Q2 to Q5, the switching elements Q2 to Q5 may also be a power MOSFET, for example. Each of diodes is connected antiparallel to each of the switching elements Q2 to Q5. Each of the switching elements Q2 to Q5 performs high-frequency switching in response to a gate signal (not illustrated) from the control unit 120A.

The filter circuit 4 is connected subsequent to the inverter circuit 3. The filter circuit 4 removes and outputs a high frequency component included in the output from the inverter circuit 3. The filter circuit 4 is provided with a reactor L2 and a condenser C3.

(3) Control Unit

With continuous reference to FIG. 1, a main circuit 120A will be illustrated.

The control unit 120A is provided with an error calculator 21, an output voltage controller 22, a low-pass filter 23a, an error calculator 31, an input current controller 32 and a PWM comparator 33.

In the first embodiment, the voltage detector PT, the error calculator 21, the output voltage controller 22 and the low-pass filter 23a constitute a first control circuit for controlling the output voltage Vd.

In the first embodiment, the current detector DCT, the error calculator 31, the input current controller 32 and the PWM comparator 33 constitute a second control circuit for controlling the chopper input current Ii.

The first control circuit generates a target current value Ir which is a target value of the chopper input current Ii such that the output voltage Vd becomes target output voltage value Vr which is a target value of the output voltage Vd.

In particular, the voltage detector PT detects the output voltage Vd. The error calculator 21 generates an error signal indicating an error between the output voltage Vd detected by the voltage detector PT and the target output voltage value Vr. The target output voltage value Vr is generated by a target value generator which is not illustrated (see FIG. 2(a)).

The low-pass filter 23a is provided on an input side of the output voltage controller 22 and removes a ripple component included in an error signal output by the error calculator 21. The low-pass filter 23a in the first embodiment corresponds to a ripple removing circuit.

Figure 2:
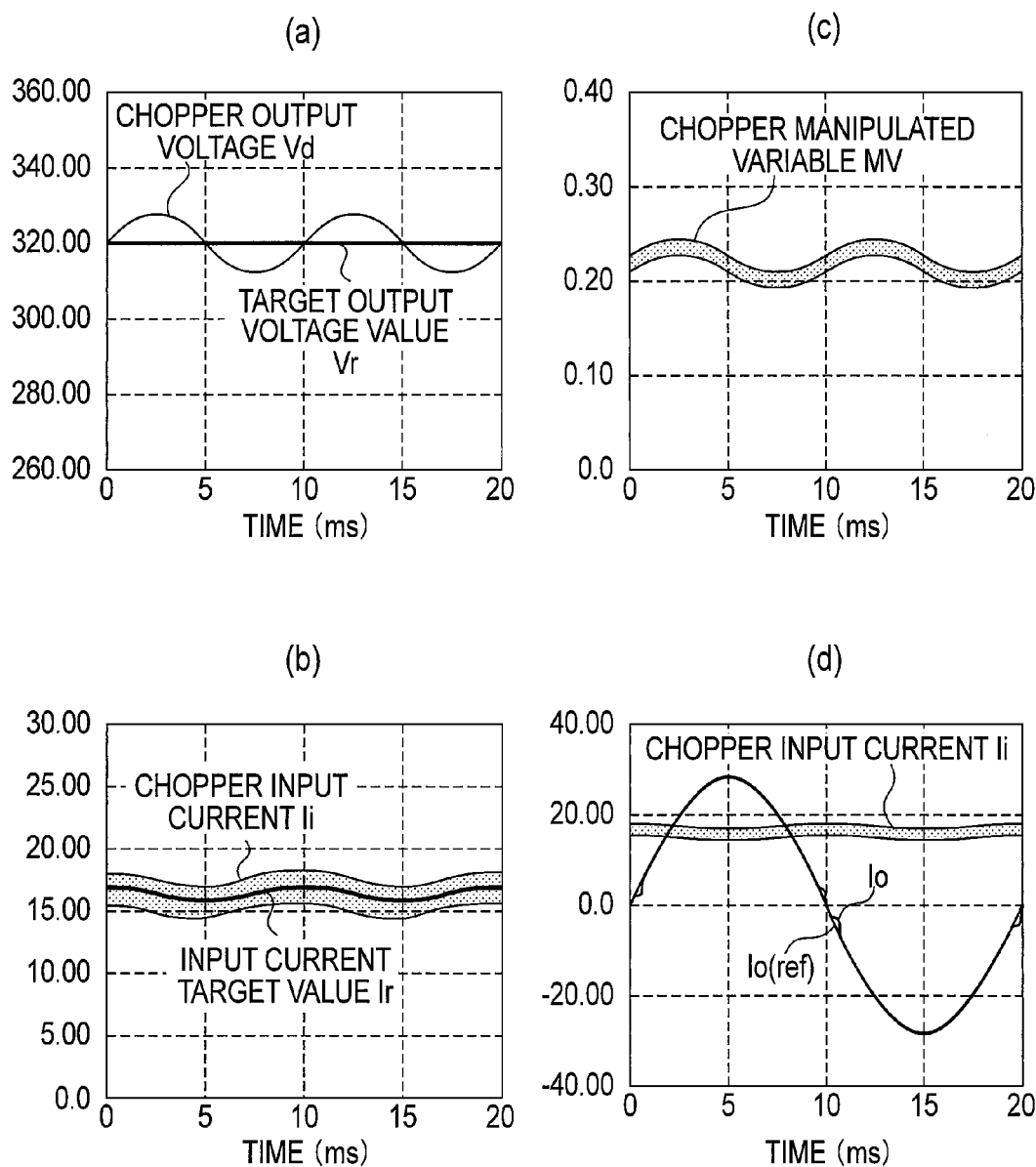
FIG. 2 is a waveform chart for illustrating an operation of the grid interconnection apparatus according to the first embodiment.

Since the output voltage Vd includes a ripple component with twice the frequency of the distribution system 10 (see FIG. 2(a)), the low-pass filter 23a is configured to remove the ripple component corresponding to that frequency.

The output voltage controller 22 generates a target current value Ir from the error signal from which the ripple component has been removed by the low-pass filter 23a. The output voltage controller 22 is configured as, for example, a PID controller.

The second control circuit controls the step-up chopper circuit 2 such that the chopper input current Ii becomes the target current value Ir (see FIG. 2(b)).

In particular, the current detector DCT detects the chopper input current Ii. The error calculator 31 generates an error signal indicating an error between the chopper input current Ii detected by the current detector DCT and the target current value Ir generated by the output voltage controller 22.

The input current controller 32 generates a chopper manipulated variable MV from that error signal. The input current controller 32 is configured as, for example, a PID controller. The chopper manipulated variable MV is a signal for manipulating a duty ratio of the gate signal G1 (see FIG. 2(c)).

The PWM comparator 33 generates the gate signal G1 on the basis of a comparison result of a standard triangular wave TRI and the chopper manipulated variable MV. The standard triangular wave TRI is generated by a triangular wave generator which is not illustrated.

(4) Operation and Effect

As described above, in the first embodiment, the chopper input current Ii and the output voltage Vd are controlled collectively by cascade control which uses an output of the first control circuit as the target value of the second control circuit (the target current value Ir).

Here, since the low-pass filter 23a of the first control circuit has removed the ripple component included in the output voltage Vd of the step-up chopper circuit 2, the target value of the second control circuit (the target current value Ir) achieves a DC level which includes substantially no ripple component (see FIG. 2(b)).

The second control circuit controls the step-up chopper circuit 2 on the basis of such a DC level, whereby the chopper input current Ii which is to be controlled also achieves a DC level which includes substantially no ripple component (see FIG. 2(d)).

Therefore, the ripple component included in the chopper input current Ii of the step-up chopper circuit 2 is suppressed substantially completely and the peak value of the chopper input current Ii is sufficiently suppressed, whereby the burden and loss of each of the reactor L1 and the switching element Q1 can be reduced sufficiently.

In the first embodiment, the low-pass filter process can be performed by digital signal processing by the low-pass filter 23a provided on an input side of the output voltage controller 22 and thus it is especially suited for a software-based process.

[Modification 1 of First Embodiment]

Figure 3:
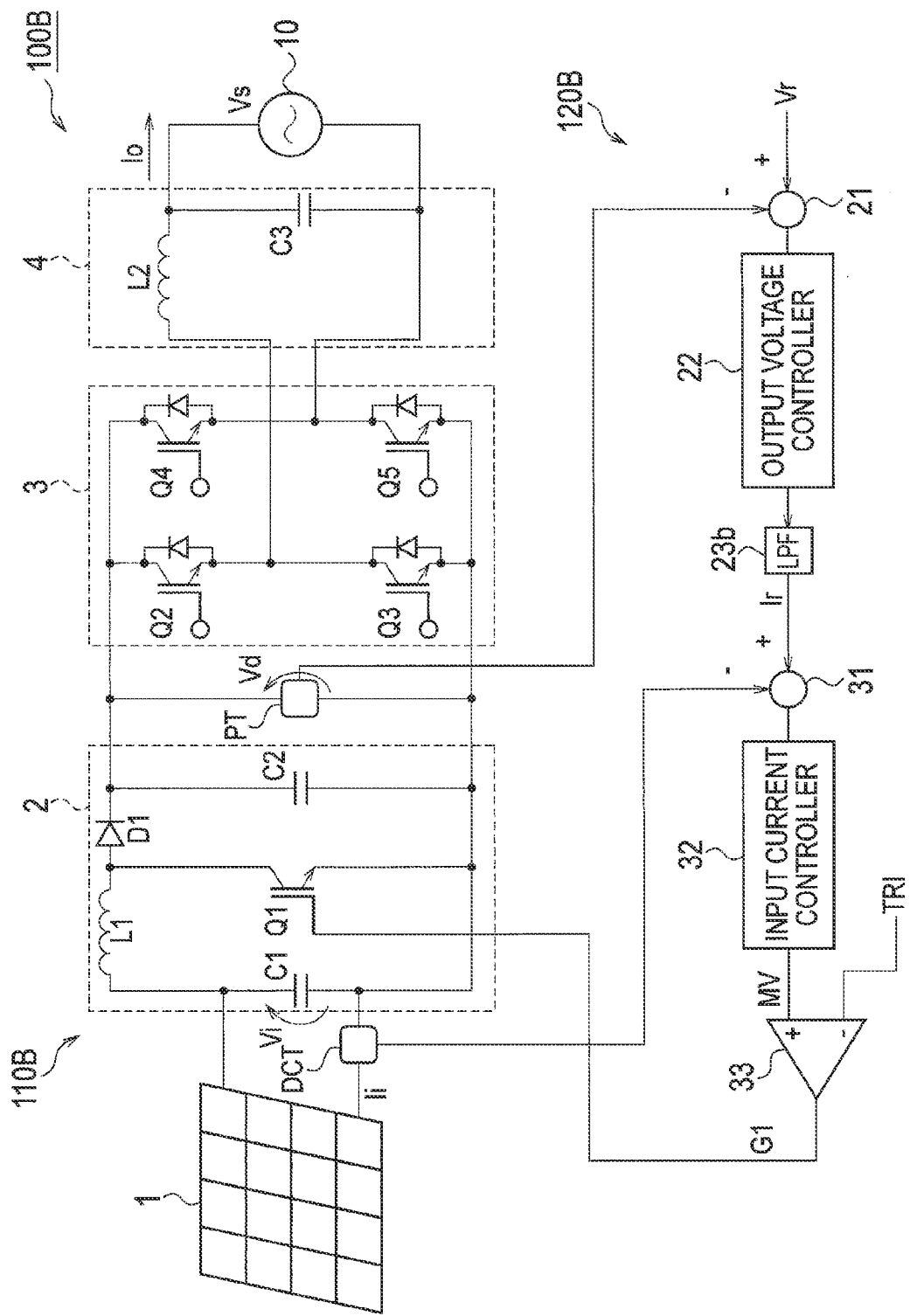
FIG. 3 is a configuration diagram of a grid interconnection system provided with a grid interconnection apparatus according to Modification 1 of the first embodiment.

FIG. 3 is a configuration diagram of a grid interconnection system provided with a grid interconnection apparatus 100B according to Modification 1 of the first embodiment.

As illustrated in FIG. 3, in this Modification, a low-pass filter 23b is provided on an output side of the output voltage controller 22. The low-pass filter 23b has the same filter characteristics as those of the low-pass filter 23a according to the first embodiment. The low-pass filter 23b removes a ripple component included in a target current value Ir generated by the output voltage controller 22. The low-pass filter 23b in this Modification corresponds to a ripple removing circuit.

The error calculator 31 generates an error signal indicating an error between the chopper input current Ii detected by the current detector DCT and the target current value Ir from which the ripple component has been removed by the low-pass filter 23b. Other configurations are the same as those of the first embodiment described above.

According to this Modification, since the target current value Ir from which the ripple component included in the output voltage Vd of the step-up chopper circuit 2 has been removed can be obtained, the target value (the target current value Ir) of the second control circuit achieves a DC level which includes substantially no ripple component and the chopper input current Ii also achieves a DC level which includes substantially no ripple component.

Therefore, the ripple component included in the chopper input current Ii is suppressed substantially completely and the peak value of the chopper input current Ii is sufficiently suppressed, whereby the burden and loss of each of the reactor L1 and the switching element Q1 can be reduced sufficiently.

Also in this Modification, the low-pass filter process can be performed by digital signal processing by the low-pass filter 23b and thus it is suited for a software-based process.

[Modification 2 of First Embodiment]

Figure 4:
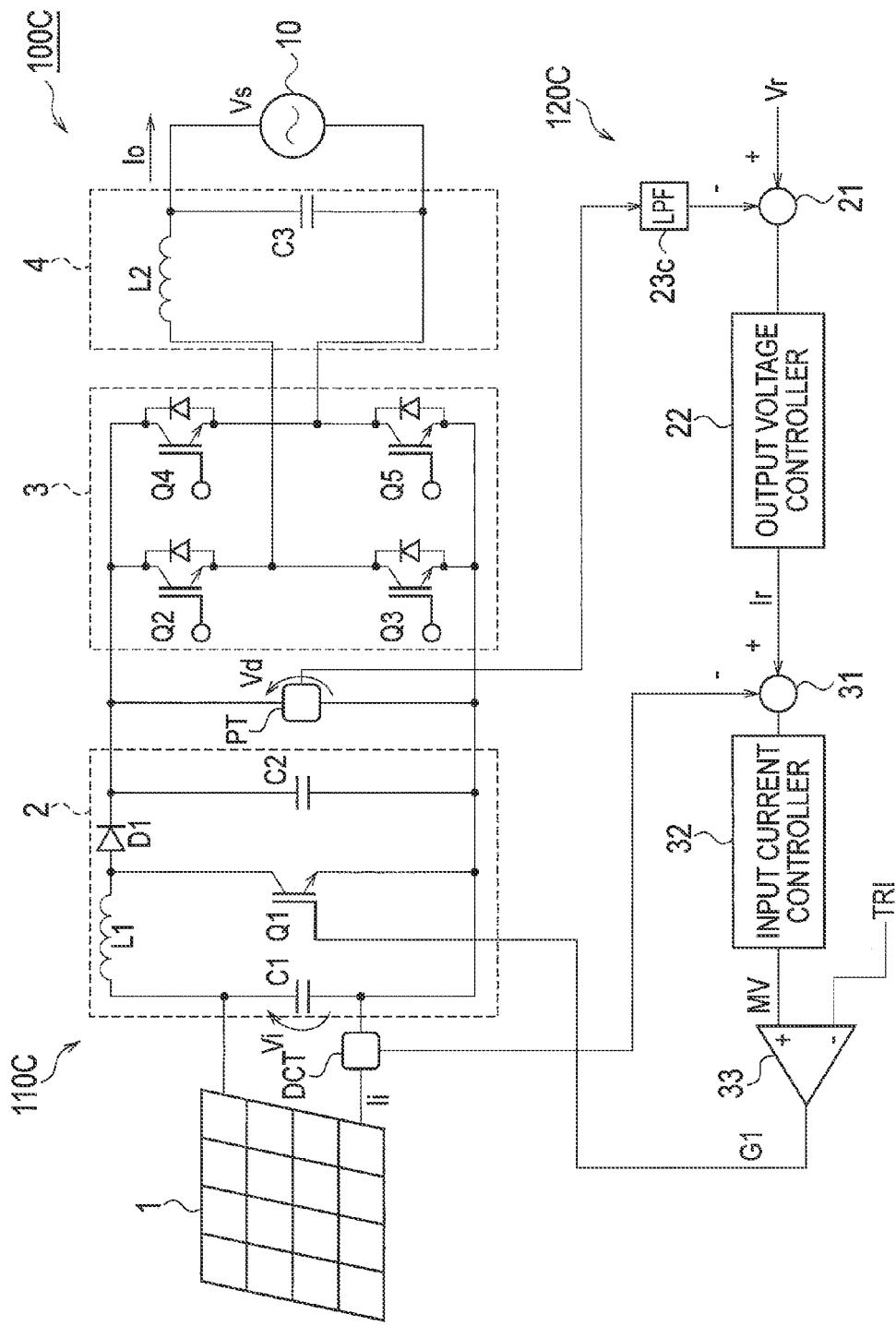
FIG. 4 is a configuration diagram of a grid interconnection system provided with a grid interconnection apparatus according to Modification 2 of the first embodiment.

FIG. 4 is a configuration diagram of a grid interconnection system provided with a grid interconnection apparatus 100C according to Modification 2 of the first embodiment.

As illustrated in FIG. 4, in this Modification, a low-pass filter 23c is provided between the voltage detector PT and the error calculator 21. The low-pass filter 23c has the same filter characteristics as those of the low-pass filter 23a according to the first embodiment. The low-pass filter 23c is provided on the input side of the error calculator 21 and removes a ripple component included in a detected value of the voltage detector PT (the output voltage Vd). The low-pass filter 23c in this Modification corresponds to a ripple removing circuit.

The error calculator 21 generates an error signal indicating an error between the detected value from which the ripple component has been removed by the low-pass filter 23c (the output voltage Vd) and the target output voltage value Vr. The output voltage controller 22 generates the target current value Ir from that error signal. Other configurations are the same as those of the first embodiment described above.

According to this Modification, since the target current value Ir from which a ripple component included in the output voltage Vd of the step-up chopper circuit 2 has been removed can be obtained, the target value (the target current value Ir) of the second control circuit achieves a DC level which includes substantially no ripple component and the chopper input current Ii also achieves a DC level which includes substantially no ripple component.

Therefore, the ripple component included in the chopper input current Ii is suppressed substantially completely and the peak value of the chopper input current Ii is sufficiently suppressed, whereby the burden and loss of each of the reactor L1 and the switching element Q1 can be reduced sufficiently.

Also in this Modification, the low-pass filter process can be performed by digital signal processing by the low-pass filter 23c and thus it is suited for a software-based process.

Second Embodiment

Figure 5:
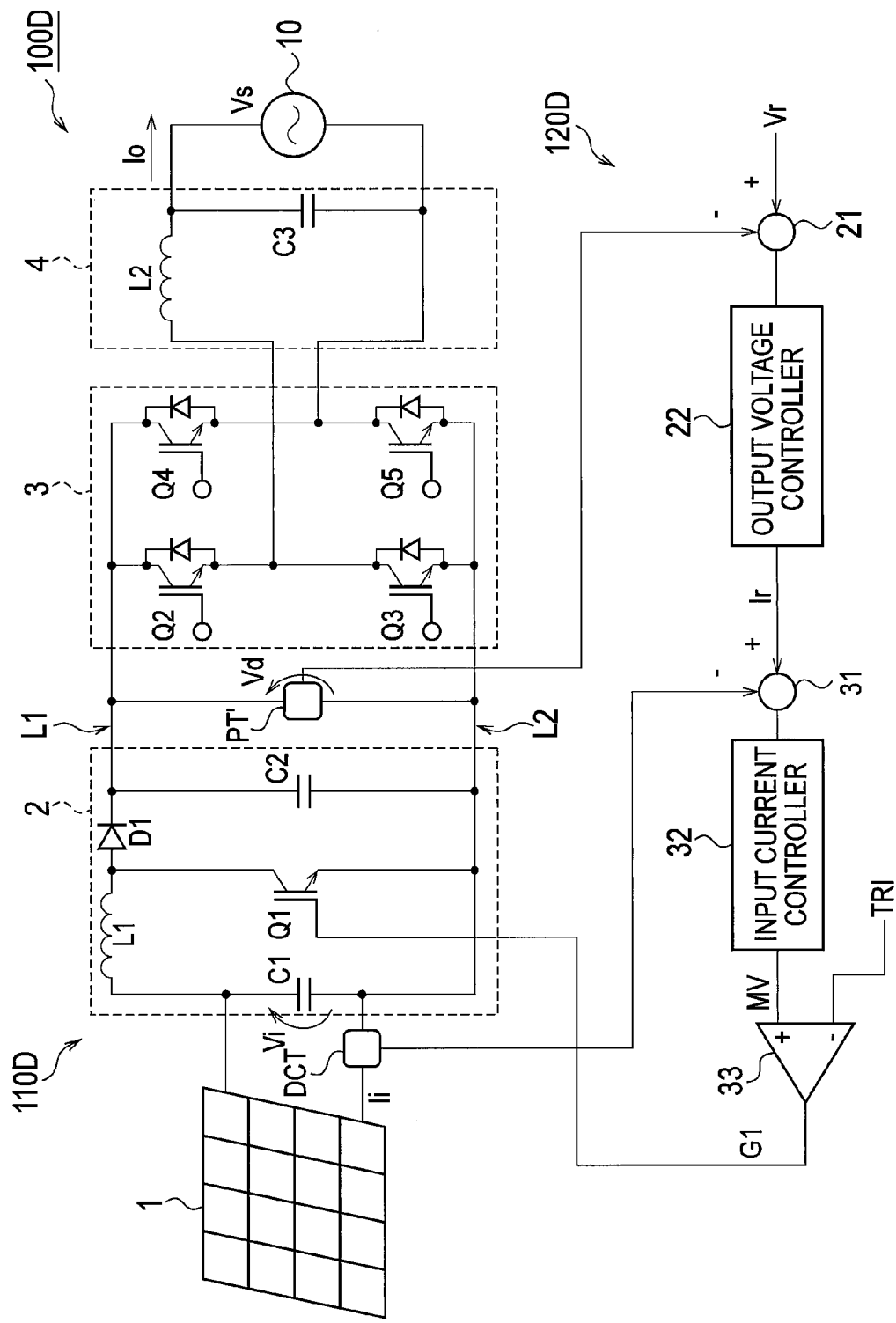
FIG. 5 is a configuration diagram of a grid interconnection system provided with a grid interconnection apparatus according to a second embodiment.

In the second embodiment, a configuration in which a voltage detector PT is provided with a function of a low-pass filter will be described. FIG. 5 is a configuration diagram of a grid interconnection system provided with a grid interconnection apparatus 100D according to the second embodiment.

As illustrated in FIG. 5, a voltage detector PT' according to the second embodiment is connected subsequent to a step-up chopper circuit 2 between a positive side line L1 and a negative side line L2. A detected value output from the voltage detector PT' is a value from which a ripple component included in an output voltage Vd has been removed.

Figure 6:
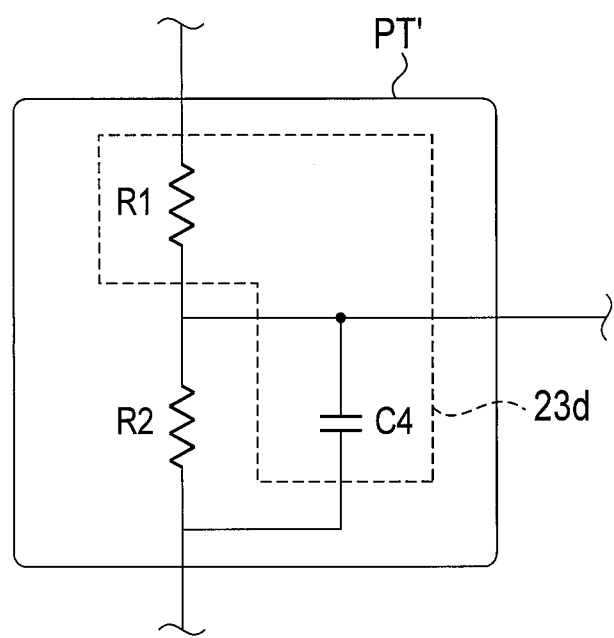
FIG. 6 is a circuit configuration diagram of a voltage detector according to the second embodiment.

FIG. 6 is a circuit configuration diagram of the voltage detector PT'. As illustrated in FIG. 6, the voltage detector PT' is provided with two resistors R1 and R2 connected in series between the positive side line L1 and the negative side line L2, and a condenser C4 connected between a junction point of the resistors R1 and R2 and the negative side line L2. A detected value of the output voltage Vd is obtained from partial pressure by the resistors R1 and R2.

Here, a low-pass filter 23d is constituted by the resistor R1 and the condenser C4. Since the output voltage Vd includes a ripple component with twice the frequency of the distribution system 10, the low-pass filter 23d is configured to remove the ripple component corresponding to that frequency. The low-pass filter 23d in the second embodiment corresponds to a ripple removing circuit.

An error calculator 21 generates an error signal indicating an error between a detected value from the voltage detector PT' and the target output voltage value Vr. The output voltage controller 22 generates a target current value Ir from that error signal. The error calculator 31 generates an error signal indicating an error between the chopper input current Ii detected by the current detector DCT and the target current value Ir generated by the output voltage controller 22. The input current controller 32 generates a chopper manipulated variable MV from that error signal. The PWM comparator 33 generates the gate signal G1 on the basis of a comparison result of a standard triangular wave TRI and the chopper manipulated variable MV.

As illustrated above, according to the second embodiment, since the voltage detector PT can be operated also as a ripple removing circuit, it is not necessary to separately provide a ripple removing circuit. A configuration in which the ripple removing circuit is provided inside the voltage detector PT is especially suited for a hardware-based process.

Third Embodiment

Figure 7:
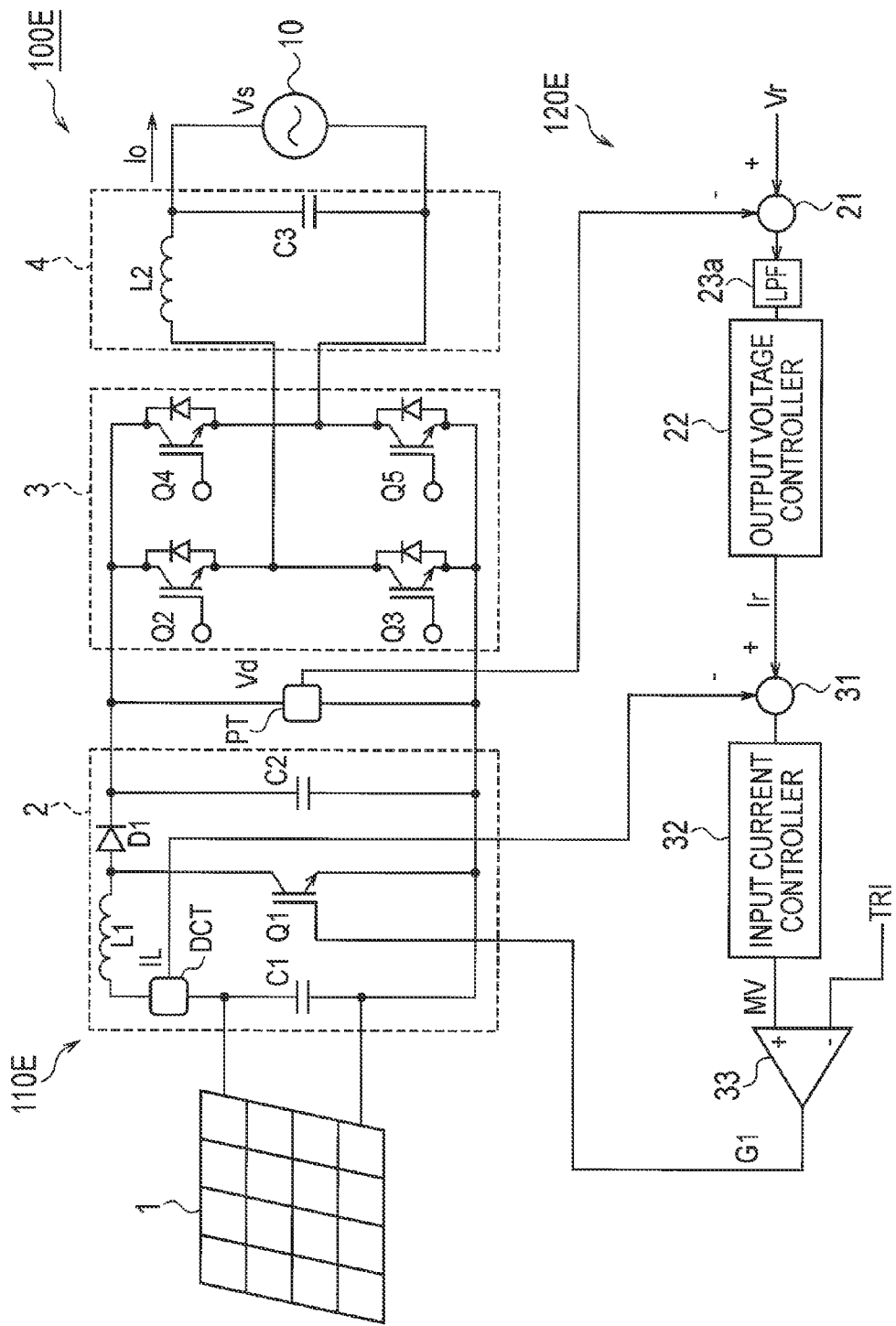
FIG. 7 is a circuit configuration diagram of a voltage detector according to a third embodiment.

FIG. 7 is a configuration diagram of a grid interconnection system provided with a grid interconnection apparatus 100E according to a third embodiment.

The third embodiment differs from the first embodiment in a connecting location of a current detector DCT in a main circuit 110E. The current detector DCT is connected preceding the reactor L1. A control unit 120E is configured in the same manner as that of the first embodiment.

The current detector DCT detects a reactor input current IL. An error calculator 31 generates an error signal indicating an error between a reactor input current IL detected by the current detector DCT and a target current value Ir.

The input current controller 32 generates a chopper manipulated variable MV from that error signal. The PWM comparator 33 generates the gate signal G1 on the basis of a comparison result of a standard triangular wave TRI and the chopper manipulated variable MV.

Since the low-pass filter 23a removes a ripple component included in output voltage Vd of a step-up chopper circuit 2 in the same manner as in the first embodiment, the target current value Ir achieves a DC level which includes substantially no ripple component.

By controlling the step-up chopper circuit 2 on the basis of such a DC level, the reactor input current IL which is to be controlled also achieves a DC level which includes substantially no ripple component. Therefore, the ripple component included in the reactor input current IL is suppressed substantially completely and the peak value of the reactor input current IL is sufficiently suppressed, whereby the burden and loss of each of the reactor L1 and the switching element Q1 can be reduced sufficiently.

Fourth Embodiment

Figure 8:
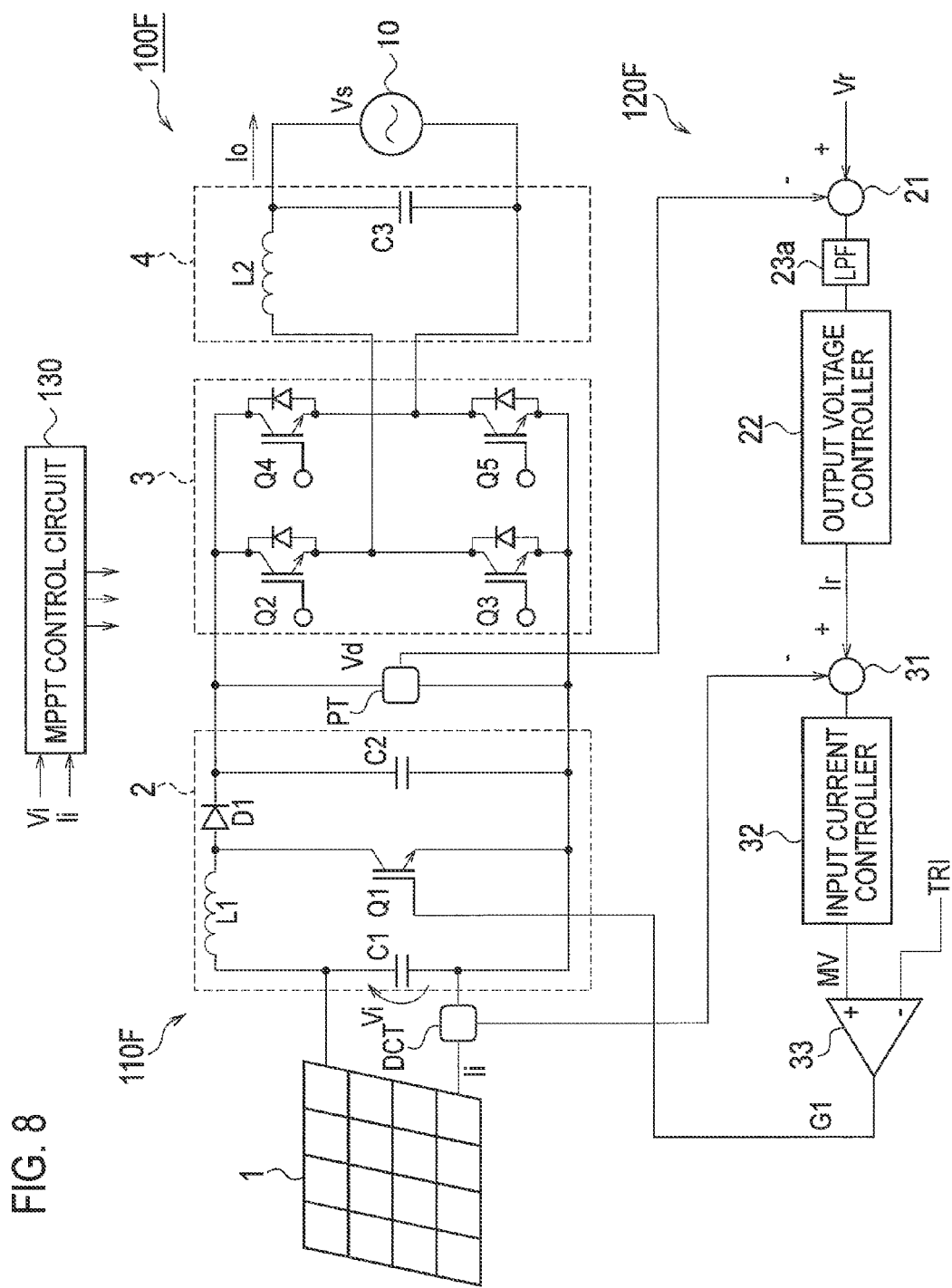
FIG. 8 is a configuration diagram of a grid interconnection system provided with a grid interconnection apparatus according to a fourth embodiment.

FIG. 8 is a configuration diagram of a grid interconnection system provided with a grid interconnection apparatus 100F according to a fourth embodiment.

As illustrated in FIG. 8, configurations of a main circuit 110F and a control unit 120F are the same as those of the first embodiment, but the fourth embodiment differs from the first embodiment in that a MPPT control circuit 130 is provided.

In the fourth embodiment, the main circuit 110F, the control unit 120F and the MPPT control circuit 130 constitute a power converting apparatus.

The MPPT control circuit 130 performs maximum power point tracking (MPPT) control in which a distributed power supply is made to operate at the optimum operating point in accordance with a chopper input current Ii and input voltage Vi.

Figure 9:
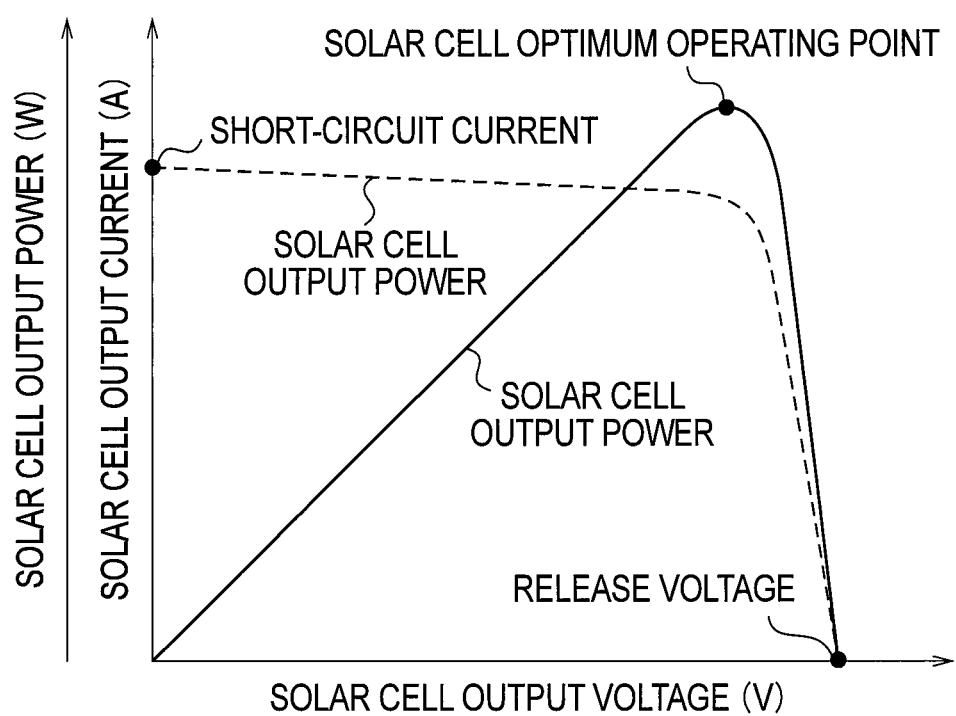
FIG. 9 is a diagram for illustrating MPPT control according to the fourth embodiment.

FIG. 9 is a diagram for illustrating the MPPT control. Usually, the optimum operating point at which the maximum generated power is obtained exists in a solar cell 1. A photovoltaic power conditioner (the grid interconnection apparatus) performs dynamic control such that solar cell 1 operates at the optimum operating point at all times even if there is, for example, variation in solar radiation.

The MPPT control includes a "hill climbing" method in which the operating point is moved forward and backward to search the point at which the generated power of the solar cell 1 becomes maximum, a "dP/dV" method in which zero of the slope of the generated power curve is searched, and a "instantaneous maximum power point tracking" method in which the operating point is made to track the pulsation of the instantaneous generated power tracking; in any of these methods, an output voltage and an output current of the solar cell 1 (that is, the input voltage Vi and the chopper input current Ii) are detected and, on the basis thereof, the optimum operating point is determined.

Therefore, suppressing an input current ripple means suppressing an input voltage ripple; this may improve precision, responsiveness and stability of the MPPT control circuit 130 which detects the input current ripple and the input voltage ripple and operates.

Accordingly, according to the fourth embodiment, since it is possible to perform the MPPT control on the basis of the chopper input current Ii of which ripple component has been suppressed substantially completely, precision, responsiveness and stability of the MPPT control can be improved.

Although an example in which the MPPT control circuit 130 is applied to the grid interconnection apparatus 100A according to the first embodiment has been described in the fourth embodiment, the MPPT control circuit 130 may also be applied to Modifications 1 and 2 of the first embodiment, to the second embodiment and to the third embodiment.

Fifth Embodiment

Hereinafter, a fifth embodiment will be described. In the following, the difference with the first embodiment will be described mainly.

In particular, a solar cell 1 is exemplified as the distributed power supply in the first embodiment. In contrast, a storage battery is exemplified as the distributed power supply in the fifth embodiment.

Figure 10:
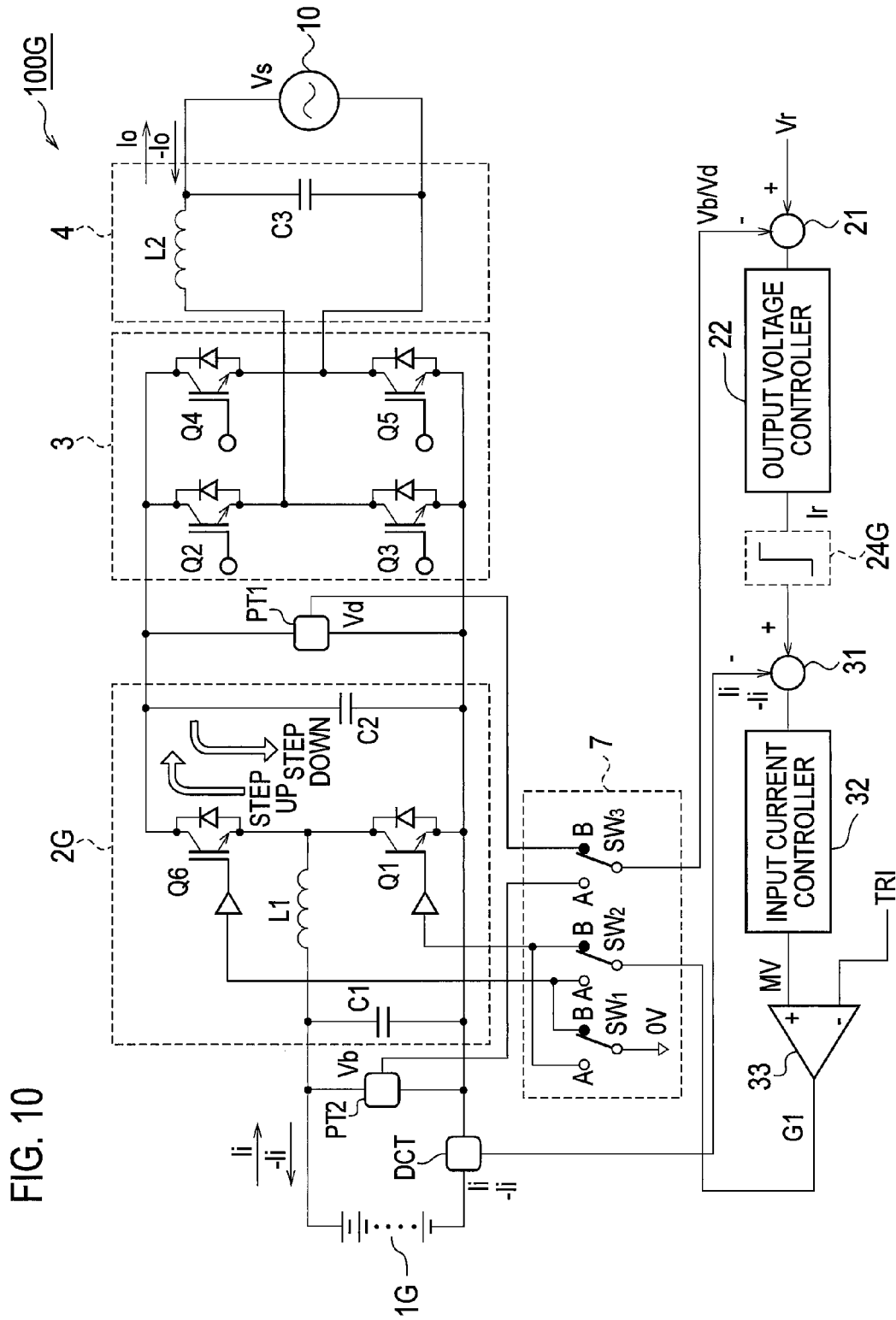
FIG. 10 is a configuration diagram of a grid interconnection system provided with a grid interconnection apparatus according to Modification 2 of a fifth embodiment.

FIG. 10 is a configuration diagram of a grid interconnection system provided with a grid interconnection apparatus 100G according to the fifth embodiment.

As illustrated in FIG. 10, the grid interconnection apparatus 100G is provided with a storage battery 1G in place of the solar cell 1, and a chopper circuit 2G in place of the step-up chopper circuit 2. The grid interconnection apparatus 100G is provided with a switch group 7. The grid interconnection apparatus 100G is further provided with a voltage detector $PT_1$ and a voltage detector $PT_2$ as voltage detectors PT.

The storage battery 1G can be charged with electricity (charge). That is, the storage battery 1G has a function to be charged with electricity (charge) supplied from the distribution system 10. The storage battery 1G can discharge electricity. That is, the storage battery 1G has a function to supply the distribution system 10 with electricity charged in itself.

Hereinafter, control to discharge electricity will be referred to as discharge control. Control to be charged with electricity will be referred to as charge control.

The chopper circuit 2G controls the input voltage Vi from the storage battery 1G, or controls the input voltage Vi to the storage battery 1G. In the fifth embodiment, the chopper circuit 2G steps up the input voltage Vi in the discharge control by performing high-frequency switching of the input voltage Vi from the storage battery 1G. On the other hand, in the charge control, the chopper circuit 2G steps down the input voltage Vi to the storage battery 1G by performing high-frequency switching of the input voltage Vi.

In the fifth embodiment, the chopper circuit 2G is provided with a switching element Q6 in addition to the switching element Q1. The switching element Q1 controls the chopper circuit 2G in the discharge control. The switching element Q6 controls the chopper circuit 2G in the charge control. In the fifth embodiment, the switching element Q1 and the switching element Q6 are constituted by an IGBT.

The switch group 7 is constituted by switches (switches $SW_1$ to $SW_3$) which switch the charge control and the discharge control.

In the discharge control, the switch $SW_1$ connects a gate of the switching element Q6 with GND (0V) ("B" of FIG. 10). In the charge control, on the other hand, the switch $SW_1$ connects a gate of the switching element Q1 with GND (0V) ("A" of FIG. 10).

In the discharge control, the switch $SW_2$ connects a gate of the switching element Q1 with an output of a PWM comparator 33 ("B" of FIG. 10). That is, in the discharge control, the chopper circuit 2G is controlled by a gate signal G1 input in the gate of the switching element Q1. In the charge control, on the other hand, the switch $SW_2$ connects the gate of the switching element Q6 with the output of the PWM comparator 33 ("A" of FIG. 10). That is, in the charge control, the chopper circuit 2G is controlled by the gate signal G1 input in the gate of the switching element Q6.

In the discharge control, the switch $SW_3$ connects an output of the voltage detector $PT_2$ with the error calculator 21 ("B" of FIG. 10). In the charge control, on the other hand, the switch $SW_3$ connects an output of the voltage detector $PT_1$ with the error calculator 21 ("A" of FIG. 10).

In the charge control, the voltage detector $PT_1$ detects output voltage Vb of the chopper circuit 2G. In the discharge control, on the other hand, the voltage detector $PT_2$ detects output voltage Vd of the chopper circuit 2G.

The switches $SW_1$ to $SW_3$ may be hardware-based switches, or may be software-based switches.

Here, in the discharge control, the first control circuit described in the first embodiment generates the target current value Ir such that the output voltage Vd becomes the target output voltage value Vr. In the discharge control, the second control circuit described in the first embodiment controls the chopper circuit 2G such that the chopper input current Ii becomes the target current value Ir.

In the charge control, on the other hand, the first control circuit described in the first embodiment generates the target current value Ir such that the output voltage Vb becomes the target output voltage value Vr. In the discharge control, the second control circuit described in the first embodiment controls the chopper circuit 2G such that the chopper input current-Ii becomes the target current value Ir.

The ripple removing circuit which removes the ripple component may be provided on the input side of the output voltage controller 22 like the low-pass filter 23a described in the first embodiment. Alternatively, the ripple removing circuit may be provided on the output side of the output voltage controller 22 like the low-pass filter 23b described in Modification 1 of the first embodiment. Alternatively, the ripple removing circuit may be provided on the input side of the error calculator 21 like the low-pass filter 23c described in Modification 2 of the first embodiment. Alternatively, the ripple removing circuit may be provided in the voltage detector PT (the voltage detector $PT_1$ and the voltage detector $PT_2$) like the voltage detector PT' described in the second embodiment.

The current detector DCT may be connected preceding the reactor L1 as described in the third embodiment.

Here, in the fifth embodiment, the grid interconnection apparatus 100G may be provided with a limiter 23G on the output side of the error calculator 21. The limiter 23G limits the target current value Ir so as not to depart from a predetermined range.

Therefore, in the charge control, the output (the charging voltage and the charging current) from the chopper circuit 2G to the storage battery 1G does not depart from the predetermined range. That is, the charging voltage becomes constant and the storage battery 1G can be charged with electricity with constant voltage. Similarly, the charging current becomes constant and the storage battery 1G can be charged with electricity with a constant current.

(Operation and Effect)

According to the fifth embodiment, in both the discharge control and the charge control, the ripple component included in the chopper input current Ii is suppressed substantially completely and the peak value of the chopper input current Ii is sufficiently suppressed, whereby the burden and loss of each of the reactor L1 and the switching element Q1 can be reduced sufficiently.

Sixth Embodiment

Hereinafter, a sixth embodiment will be described. In the following, the difference with the fifth embodiment will be described mainly.

In particular, the grid interconnection apparatus is connected to the distribution system 10 in the fifth embodiment. In contrast, the grid interconnection apparatus is connected to the load in the sixth embodiment. The load is, for example, home electronics and an electric vehicle.

Figure 11:
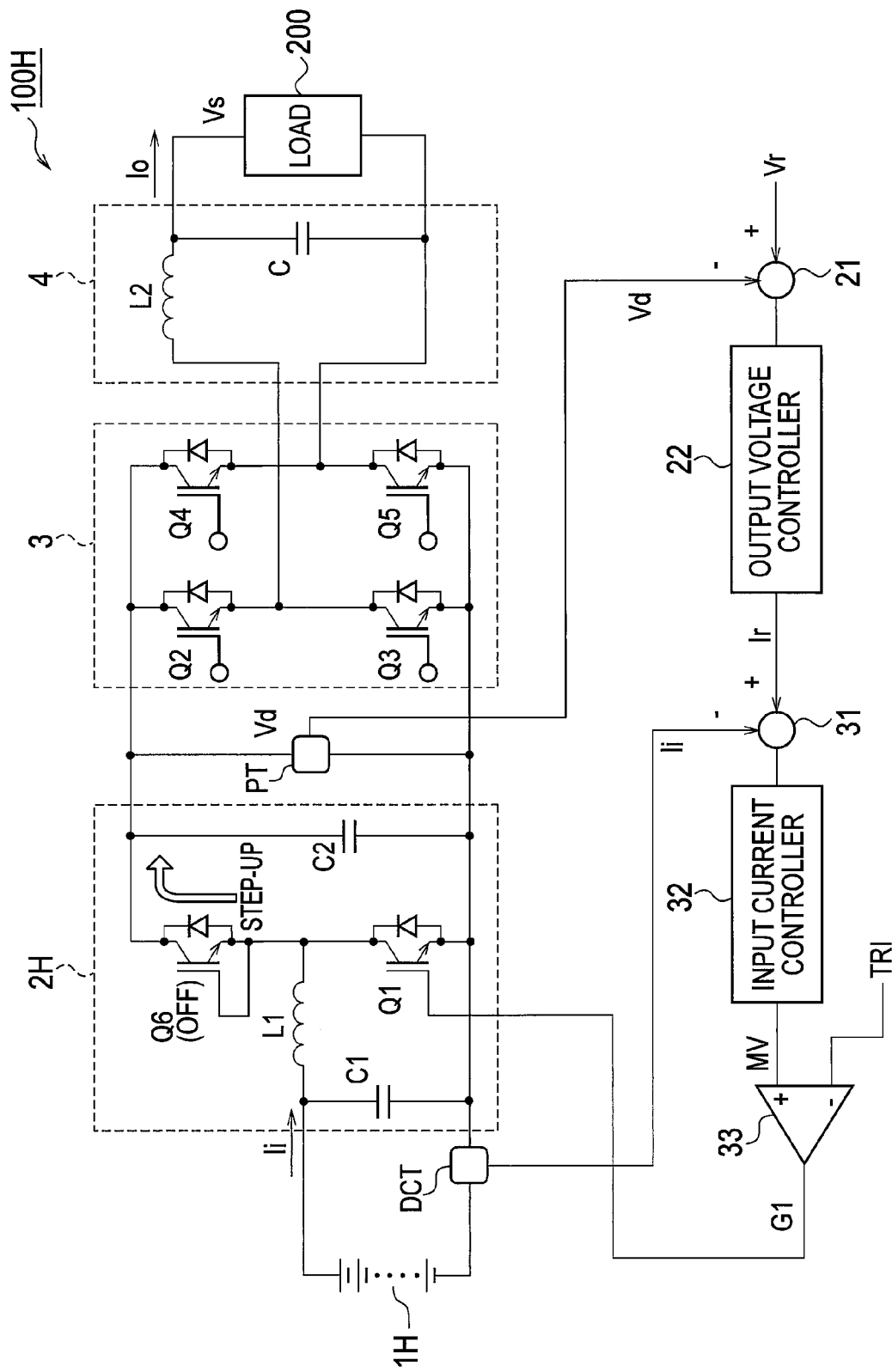
FIG. 11 is a configuration diagram of a grid interconnection system provided with a grid interconnection apparatus according to Modification 2 of a sixth embodiment.

FIG. 11 is a configuration diagram of the grid interconnection system including a grid interconnection apparatus 100H according to the sixth embodiment.

As illustrated in FIG. 11, the grid interconnection apparatus 100H is connected to the load 200. As compared with the grid interconnection apparatus 100G, a configuration necessary for the charge control (for example, the voltage detector $PT_2$ and the switch group 7) is omitted in the grid interconnection apparatus 100H.

(Operation and Effect)

According to the sixth embodiment, in a case in which a storage battery 1H functions as a self-contained independent power source, the ripple component included in the chopper input current Ii is suppressed substantially completely and the peak value of the chopper input current Ii is sufficiently suppressed, whereby the burden and loss of each of the reactor L1 and the switching element Q1 can be reduced sufficiently.

Other Embodiments

As described above, although the present invention has been described with reference to the embodiment, it should not be understood that the discussion and the drawings which constitute a part of the present invention is restrictive to the invention. Various alternatives, examples and operational techniques will be clear to a person skilled in the art from this disclosure.

In each embodiment described above, the solar cell 1 is exemplified as a distributed power supply but the distributed power supply is not limited to the solar cell; a fuel cell, for example, may be used as the distributed power supply.

The main circuits 110A to 110F according to the embodiment described above are illustrative only; a high-frequency insulated DC-DC converter, for example, may be used in place of the step-up chopper circuit 2. The inverter circuit 3 is not limited to a single-phase grid interconnection inverter but a three-phase grid interconnection inverter and a motor inverter may also be used. In a case in which voltage of the distributed power supply is higher than voltage of the distribution system, a step-down converter may be used in place of the step-up chopper circuit 2.

It is to be understood that the present invention encompasses, for example, various other embodiments not expressly stated herein. Accordingly, the present invention shall only be limited by the matter to define the invention to be reasonably understood from this disclosure and defined by the appended claims.

The entire content of Japanese Patent Application No. 2010-013101 (Jan. 25, 2010) is incorporated to the specification of the present application by reference.

INDUSTRIAL APPLICABILITY

According to the present invention, a power converting apparatus, a grid interconnection apparatus and a grid interconnection system capable of sufficiently reducing the burden and loss of a device in a DC-DC converter circuit and providing the entire power converting apparatus with increased efficiency, reduced size and lowered cost can be provided.

The invention claimed is:

1. A power converting apparatus including a DC-DC converter circuit configured to step up or down input voltage from a DC power supply and a DC-AC converter circuit configured to convert output voltage of the DC-DC converter circuit into AC, the power converting apparatus comprising:
a first control circuit configured to control the output voltage; and
a second control circuit configured to control an input current of the DC-DC converter circuit,
wherein:
the first control circuit generates a target current value which is a target value of the input current such that the output voltage becomes a voltage target value which is a target value of the output voltage;
the second control circuit controls the DC-DC converter circuit such that the input current becomes the target current value generated by the first control circuit; and
the first control circuit is provided with a ripple removing circuit configured to remove a ripple component included in the output voltage.

2. A grid interconnection system comprising the distributed power supply and the power converting apparatus according to claim 1, wherein the power converting apparatus is configured to interconnect the distributed power supply to a distribution system.

3. The power converting apparatus according to claim 1, wherein:
the first control circuit includes a voltage detector configured to detect the output voltage, an error calculator configured to generate an error signal indicating an error between the detected output voltage and the voltage target value, and a controller configured to generate the target current value from the error signal; and
the ripple removing circuit is provided on an input side or an output side of the controller, or between the voltage detector and the error calculator.

4. The power converting apparatus according to claim 1, wherein:
the first control circuit includes a voltage detector configured to detect the output voltage, an error calculator configured to generate an error signal indicating an error between the detected output voltage and the voltage target value, and a controller configured to generate the target current value from the error signal; and
the voltage detector is provided with the ripple removing circuit.

5. The power converting apparatus according to claim 1, further comprising a tracking control circuit configured to perform optimum power point tracking control in which the distributed power supply is made to operate at the optimum operating point on the basis of the input current and the input voltage.

6. The power converting apparatus according to claim 1, wherein the distributed power supply is a solar cell, a fuel cell or a storage battery.

7. A grid interconnection apparatus comprising the power converting apparatus according to claim 1, wherein the power converting apparatus is configured to interconnect the distributed power supply to a distribution system.

* * * * *